Patented May 23, 1933

1,910,874

UNITED STATES PATENT OFFICE

PAUL F. ZIEGLER, OF EVANSTON, AND HARRY E. SIMMONS, OF CHICAGO, ILLINOIS, ASSIGNORS TO THE KENDALL COMPANY, OF BOSTON, MASSACHUSETTS, A CORPORATION OF MASSACHUSETTS

CHEMICAL HEATING COMPOSITION AND METHOD OF PRODUCING HEAT

No Drawing.   Application filed September 19, 1930. Serial No. 483,127.

This invention relates to a composition and method for chemically producing heat. One of the important uses of compositions of this nature is in connection with heating pads which are used as hot packs for applying heat to the body to relieve pain, much as in the manner of use of the ordinary hot water bottle or electric heating pad.

A composition adapted for such use must measure up to certain standards of service before it can be considered as having commercial possibilities. Perhaps the most important of these is that it must be capable of generating usable quantities of heat without the evolution of objectionable odors. As the heating pads are commonly used in sick rooms, the giving off of obnoxious gases by the mixture is highly undesirable. The mixture also must be capable of giving off quantities of heat over a considerable period of time and under conditions which may be accurately controlled to avoid the possibility of injury to the patient by overheating. A further requirement, not to be overlooked, is that the ingredients of the composition must be readily obtainable at comparatively low cost. The object of our invention is to provide a heating composition which will conform to the above mentioned requirements.

The composition consists primarily of the combination with a metal of substances which in the presence of water will promote the oxidation of the metal, oxidation of the metal being accompanied by the evolution of heat. The metal employed is preferably iron, although other metals such as copper, nickel, aluminum, zinc, and the like, may be used. Metals of the type which are suitable for this purpose may appropriately be referred to as "reactive" metals, using the term as applying to metals which may be oxidized in the presence of moisture at temperatures of, say, 200° F. or less. The accelerating agent is preferably activated charcoal, this material being particularly desirable because of its marked ability to eliminate the objectionable odor which ordinarily accompanies the oxidation of the metal.

Activated charcoal is ordinary charcoal, usually of vegetable origin, which has been treated by a suitable process to remove the hydrocarbon impurities. This treatment greatly increases its porosity and enhances its adsorptive capacity.

We have found that when iron, for example, in finely divided condition, is mixed with activated charcoal, and water is added to the mixture, a considerable amount of heat is evolved. Moreover, no objectionable odor whatever is apparent during the course of the reaction. For example, the mixture of the following ingredients:

|  | Grams |
|---|---|
| Iron | 200 |
| Activated charcoal | 20 | when treated with 50 grams of water reached a temperature of 160° F. in 35 seconds. The evolution of heat continued for approximately 25 hours.

The iron used in the above mixture consisted of the following proportions of coarse and fine iron particles:

| Mesh | Per cent |
|---|---|
| 40–60 | 5 |
| 60–80 | 70 |
| 80–100 | 1 |
| Over 100 | 24 |

Unless otherwise specified, this is the character of the iron used in all of the examples hereinafter referred to.

The action of the activated charcoal in eliminating objectionable odors is undoubtedly due to its adsorptive power. Its action as an accelerating agent, which will be referred to hereinafter more in detail, is in all probability due to the physical effect of the extensive surface which it presents to the reaction mixture. However, whatever may be the explanation of its action, it has proven in practice to be a most effective ingredient.

The use in the mixture of certain substances in addition to a metal and activated charcoal, or other adsorptive accelerating agent, has been found desirable. Certain ingredients may be used to give bulk to the mixture without impairing its heat generating capacity per unit weight. Among such substances we have found that certain silicides, particularly the silicic acids, are useful. A mixture of iron and silicic acid alone will generate very appreciable amounts of heat. However, it is preferred to use, in addition, enough activated charcoal to avoid any objectionable odor. A typical example of a mixture of these ingredients is the following:

|  | Grams |
|---|---|
| Iron | 200 |
| Activated charcoal | 20 |
| Silicic acid ($H_2SiO_3$) | 20 |

This mixture, when treated with 50 grams of water reached a temperature of 160° F. in 35 seconds and had a life of about 25 hours. No odor whatever was apparent during the entire course of the reaction.

The silicic acid used is obtainable in the form of fine powder which may be readily mixed with the powdered iron and charcoal. Other silicic acids containing more or less amounts of water may be used in place of the meta silicic acid in the above formula. Silica gel (partially dehydrated silicic acid), pumice stone (complex silicates of AlNa and K), and diatomacious earth may be used in place of the silicic acid in the above formula.

The use in the mixture of certain ionizable substances, particularly the halogen salts of certain metals, has also been found beneficial. Lead chloride and ferric chloride are examples of such a substance. The ionizable ingredient may be used either with the metal and the activated charcoal alone, or in conjunction with a silicide. A mixture of the following ingredients:

|  | Grams |
|---|---|
| Iron | 200 |
| Activated charcoal | 20 |
| $FeCl_3$ | 2 | when treated with 50 grams of water reached a temperature of 160° F. in 30 seconds. The mixture had a life of about 30 hours and no odor was evolved during the course of the reaction.

The action of compounds of this class is undoubtedly due to their property of being ionizable in solution, the reactions involved being at least partially electrochemical in nature. Any electrolyte would, therefore, undoubtedly help the reaction to some extent. Inorganic salts in general, and particularly the halogen salts, have been found particularly meritorious in this respect. The halogen salts of metals such as lead, copper, iron and nickel, which have more than one valence, appear to promote the reaction better than those of the metals having a single valence.

The use of bone black in the mixture, either alone or with a silicide and an electrolyte, has been found to give good results. A mixture of iron and bone black alone, in the proportion of about four parts of iron to one part of bone black, when treated with water, has been found to generate usable quantities of heat. The addition to this mixture of a small amount of activated charcoal is desirable to prevent the emission of objectionable odors. A relatively small amount of the activated charcoal will, in the presence of bone black, completely obliterate any odor. The following is an example of a typical mixture using bone black:

|  | Grams |
|---|---|
| Iron | 200 |
| Activated charcoal | 5 |
| $FeCl_3$ | 2 |
| Bone black | 55 |

This mixture generated usable amounts of heat over a period of about 30 hours. As in the other examples cited, no odor whatsoever was apparent.

As a means of controlling the evenness of the temperature and the uniformity of the reaction, certain inert absorbent materials such as woodflour, cellulose absorbent wadding, sawdust, and the like, may be used in the body of the mixture. Such materials tend to prevent localization of the action by spreading the moisture evenly through the body of the reaction mixture. They also tend to give life to the mixture by holding the water over an extended period of time.

A typical example of a composition employing an inert absorbent material is as follows:

|  | Grams |
|---|---|
| Iron | 200 |
| Activated charcoal | 20 |
| $FeCl_3$ | 2 |
| Fine woodflour | 20 |

The type of inert absorbent material used and the degree of fineness thereof have a marked effect on the temperature of the reaction mixture. Other conditions being the same, the coarser the absorbent material the lower the temperature will be.

We have also found that the temperature may be accurately controlled by apportioning the relative amounts of coarse and fine metal particles used. We have found, for example, when using iron as the metal that the temperature may be very accurately regulated according to the fineness of the iron used. In one test, in which all ingredients were kept constant except the mesh of the iron used, the following relation between the peak temperature and the mesh of the iron was observed:

| Mesh iron | Peak temperature Fahrenheit |
|---|---|
| 20 | 151° |
| 30 | 181° |
| 40 | 198° |
| 50–60 | 202° |
| 80 | 205° |
| 100 | 209° |

The control of the physical state of the metal, as indicated, affords a very accurate method of regulating the temperatures to give any desired degree of heat, depending upon the particular application for which the mixture is to be used.

As previously stated, activated charcoal acts both as a deodorant and as an accelerating agent. Its pronounced effect in the latter respect is illustrated by the following example. A mixture of:

|   | Grams |
|---|---|
| Iron | 200 |
| $FeCl_3$ | 2 |
| Woodflour | 60 | when treated with 50 grams of water required 4 minutes to reach a temperature of 145° F. By using 20 grams of woodflour instead of 60, as in the above formula, and then adding 20 grams of activated charcoal, a mixture was obtained which, when similarly treated, reached a temperature of 150° F. in 35 seconds. The accelerating effect is in all probability due to the extensive surface presented to the reaction mixture by the charcoal. The phenomenon appears to be the result of surface catalysis rather than chemical interaction with the charcoal itself.

Certain other substances have been found to have valuable heat generating properties when mixed with a finely divided metal in the presence of water. Such substances may consist of organic acids. For example, a mixture of finely divided iron and oxalic acid, when treated with water, will generate very appreciable amounts of heat. The oxalic acid is preferably used in conjunction with activated charcoal to eliminate possible evolution of objectionable odors. One or more of the other ingredients mentioned may also be added if desired. Antimony oxide also has been found to be a very valuable heat generating ingredient, either with iron alone or in combination with one or more of the previously mentioned ingredients.

In practice the heating mixtures are enclosed in a suitable container adapted to the particular use in question. When employed in hot packs for heating the body the mixture may be enclosed in a flexible bag of duct, canvas or paper, having an opening permitting the introduction of water. In the dry condition the ingredients are completely inactive so that the bag may be stored without danger of deteriorating. After adding water the bag is placed in a rubber container to prevent evaporation of moisture, and may then be applied to the body. If it is not desired to use the bag for the full period of its life it may be removed from the waterproof container and allowed to dry out. When water is again added to the partially spent mixture the bag will again give off heat. Tests show that the life of the mixture is somewhat greater when the reaction is allowed to proceed continuously over the full period of life. The intermittent use, however, is wholly practicable, and several good heats for periods of from five to seven hours may easily be obtained from one bag.

The foregoing detailed description has been given for clearness of understanding only and no unnecessary limitations should be understood therefrom, but the appended claims should be construed as broadly as permissible in view of the prior art.

Having described my invention, what I regard as new and desire to secure by Letters Patent is:

1. A composition for producing heat by chemical action with water, comprising a mixture of a reactive metal and an adsorptive accelerating agent in the proportions of at least two parts of the metal to one part of the adsorptive accelerating agent.

2. A composition for producing heat by chemical action with water, comprising a mixture of a reactive metal and activated charcoal in the proportions of at least two parts of the metal to one of the charcoal.

3. A composition for producing heat by chemical action with water, comprising a loose mass of finely divided reactive metal, apportioned into predetermined amounts of coarse and fine particles according to the temperature desired, and activated charcoal distributed throughout the mass of the metal, said metal and charcoal being in the proportions of at least two parts of the metal to one of the charcoal.

4. A composition for producing heat by chemical action with water, comprising a mixture of iron in finely divided condition and activated charcoal, the iron and charcoal being in the proportions of at least two parts of the metal to one of the charcoal.

5. A composition for producing heat by chemical action with water, comprising a mixture of approximately 200 parts of a reactive metal and approximately 20 parts of activated charcoal.

6. A composition for producing heat by chemical action with water, comprising a mixture of a reactive metal and adsorptive accelerating agent, in the proportions of at least two parts of the metal to one part of the adsorptive accelerating agent, and an electrolyte.

7. A composition for producing heat by chemical action with water, comprising a mixture of a reactive metal and activated charcoal, in the proportions of at least two parts of the metal to one part of the activated charcoal, and an electrolyte.

8. A composition for producing heat by chemical action with water, comprising a mixture of a reactive metal and activated charcoal, in the proportions of at least two parts of the metal to one part of the activated charcoal, and an electrolyte comprising a halogen salt of the metal.

9. A composition for producing heat by chemical action with water, comprising a mixture of a reactive metal and activated charcoal, in the proportions of at least two parts of the metal to one part of the charcoal, and a salt of a metal selected from the group of metals which comprises the above mentioned metal and metals below the latter in the electro-motive series of metals.

10. A composition for producing heat by chemical action with water, comprising a mixture of a reactive metal in finely divided condition and activated charcoal, in the proportions of at least two parts of the metal to one part of the activated charcoal, and a salt of copper.

11. A composition for producing heat by chemical action with water, comprising a mixture of a reactive metal and activated charcoal, in the proportions of at least two parts of the metal to one part of the activated charcoal, and an electrolyte comprising a chloride of iron.

12. A composition for producing heat by chemical action with water, comprising a mixture of approximately the following parts: 200 parts iron in finely divided condition, 20 parts activated charcoal and 2 parts ferric chloride.

13. The method of chemically producing heat, which consists in mixing activated charcoal with a finely divided reactive metal and adding water to said mixture to set up a heating reaction.

14. The method of chemically producing heat, which consists of mixing activated charcoal with a finely divided reactive metal in the proportions of not more than one part of the charcoal to two parts of the metal and adding water to the mixture to set up a heating reaction.

15. The method of chemically producing heat, which consists of mixing activated charcoal and an electrolyte with reactive metal in finely divided condition and thereafter adding water to the mixture to set up a heating reaction.

In witness whereof, we hereunto subscribe our names to this specification.

PAUL F. ZIEGLER.
HARRY E. SIMMONS.